United States Patent [19]

Uemura et al.

[11] Patent Number: 5,373,035
[45] Date of Patent: Dec. 13, 1994

[54] ADHESIVE COMPOSITION

[75] Inventors: Hiroshi Uemura, Muko; Etsuo Yoshida, Kameoka, both of Japan

[73] Assignee: Ohara Paragium Chemical Co., Ltd., Kyoto, Japan

[21] Appl. No.: 704

[22] Filed: Jan. 5, 1993

[30] Foreign Application Priority Data

Oct. 9, 1992 [JP] Japan .................... 4-297626

[51] Int. Cl.$^5$ ........................... C08K 9/06
[52] U.S. Cl. ........................... 523/212; 523/176; 523/213; 524/265; 524/492; 524/730; 524/731; 524/850
[58] Field of Search .............. 523/212, 213, 176; 524/850, 492, 265, 730, 731

[56] References Cited

U.S. PATENT DOCUMENTS

| | | | |
|---|---|---|---|
| 4,477,607 | 10/1984 | Litke | 523/212 |
| 4,533,422 | 8/1985 | Litke | 156/307.3 |
| 4,686,247 | 8/1987 | Yosida | 523/213 |
| 4,713,405 | 12/1987 | Koga et al. | 523/212 |
| 4,764,545 | 8/1988 | Yosida | 523/212 |
| 4,837,260 | 6/1989 | Sato et al. | 524/261 |
| 4,845,151 | 7/1989 | Sivy | 524/762 |
| 4,857,593 | 8/1989 | Leung et al. | 525/92 |

*Primary Examiner*—Paul R. Michl
*Assistant Examiner*—John J. Guarriello
*Attorney, Agent, or Firm*—Armstrong, Westerman, Hattori, McLeland & Naughton

[57] ABSTRACT

An adhesive composition comprising an alpha-cyanoacrylate and a hydrophobic silica surface-treated with dimethyldichlorosilane, the composition being characterized in that the composition has incorporated therein at least one of a polyether-modified silicone or alcohol-modified silicone in an amount of 0.05 to 5.0% based on the weight of the composition.

1 Claim, No Drawings

ADHESIVE COMPOSITION

BACKGROUND OF THE INVENTION

1. Field of the Invention

The present invention relates to adhesive compositions, and more particularly to alpha-cyanoacrylate adhesive compositions.

2. Description of the Prior Art

Alpha-cyanoacrylates are in wide use as instantaneous adhesives but have a low viscosity of about 2 about 3 cps, so that it is often desired to thicken these compounds to a desired viscosity for the convenience of use.

For example, it is attempted to dissolve an organic polymer, such as polymethyl methacrylate or hydroxyethyl cellulose acetate, in an alpha-cyanoacrylate to impart viscosity to the compound.

However, the composition incorporating such an organic polymer is a fluid having a cobwebbing property. For more convenient use, therefore, techniques have also been developed for preparing a thixotropic pasty composition comprising an alpha-cyanoacrylate and a hydrophobic fumed silica.

Already known as hydrophobic fumed silicas are those which are prepared by treating the surface of a hydrophilic fumed silica with polydimethylsiloxane, trialkoxyalkylsilane, hexamethyldisilazane or dimethyldichlorosilane.

When the hydrophobic fumed silica obtained by the treatment with polydimethylsiloxane or hexamethyldisilazane is admixed with alpha-cyanoacrylate in an amount of 5 to 8 wt. % based n the resulting composition, the composition obtained is thixotropic, pasty and about 30000 to about 70000 cps in viscosity, whereas the hydrophobic fumed silica as treated with dimethyldichlorosilane affords only a flowable composition having a viscosity of about 200 to about 900 cps even if incorporated therein in an amount of 8 to 15 wt. %.

In fact, the specification of U.S. Pat. No. 4,533,422 states that use of such a hydrophobic fumed silica obtained by the treatment with dimethyldichlorosilane merely provides a composition of low viscosity. Thus, the combination of alpha-cyanoacrylate and hydrophobic fumed silica as treated with dimethyldichlorosilane fails to give a nonflowable pasty composition.

SUMMARY OF THE INVENTION

We conducted intensive research to overthrow such an existing concept and to complete a technique for preparing pasty compositions having thixotropic characteristics by admixing the hydrophobic fumed silica, as treated with dimethyldichlorosilane, with an alpha-cyanoacrylate.

Our research revealed that fluid compositions only are obtained by admixing the hydrophobic silica as treated with dimethyldichlorosilane (hereinafter referred to merely as the "hydrophobic silica") with an alpha-cyanoacrylate, for example, in such an amount that the composition contains 12 to 15 wt. % of the silica.

Presumably, the reason why the addition of the hydrophobic silica with the alpha-cyanoacrylate fails to give a pasty composition is that the interaction between the fine particles of the hydrophobic silica, i.e., hydrogen bond, is too weak to form a reticular structure.

We have repeatedly conducted various experiments and found that when a specified polyether-modified silicone, alcohol-modified silicone or polyalkylene oxide compound is added in a small amount to a composition comprising an alpha-cyanoacrylate and the hydrophobic silica, the compound assists in enhancing the interaction between the particles of hydrophobic silica, contributing to the formation of a reticular structure to readily produce a pasty composition.

DETAILED DESCRIPTION OF THE INVENTION

The present invention relates to techniques for producing thixotropic pasty compositions of alpha-cyanoacrylate. More particularly, the invention provides a pasty alpha-cyanoacrylate adhesive composition which is industrially useful by incorporating into a composition comprising an alpha-cyanoacrylate and a hydrophobic silica a small amount of a synergist for giving an enhanced thixotropic effect, i.e., a specified polyether-modified silicone, alcohol-modified silicone or polyalkylene oxide compound.

Alpha-cyanoacrylates useful for the present invention are a wide variety of those heretofore used for adhesive compositions of the type mentioned. Stated more specifically, the alpha-cyanoacrylate to be used is at least one compound represented by the formula 1.

Formula 1:

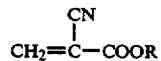

wherein R is straight-chain or branched alkyl having 1 to 16 carbon atoms, allyl, or phenyl having or not having a substituent. The hydrophobic silica to be used in the present invention is any of those conventionally used for adhesive compositions of the type mentioned. Typical examples of such silicas are those commercially available under the brand names of "Aerosil R-972," "Aerosil R-974" and "Aerosil R-976" (products of Degussa) and "Reolosil DM-10" (product of Tokuyama Soda Co., Ltd.).

Hydrophobic silicas have HCL adsorbed thereto due to the production process, so that products of different lots are likely differ in pH value (amount of adsorbed HCL).

When the hydrophobic silica to be used in the invention has a pH value of up to 4 and is admixed with alpha-cyanoacrylate to obtain an adhesive composition, the composition tends to exhibit a longer setting time. Accordingly, the hydrophobic silica to be used is preferably 4.0 to 5.0, more preferably 4.2 to 5.0, in pH value.

When the hydrophobic silica is merely admixed with alpha-cyanoacrylate, the resulting composition fails to exhibit thixotropic characteristics as already described. When a specified modified silicone compound or polyalkylene oxide compound is incorporated in a small amount into the composition, highly thixotropic characteristics can be imparted to the composition. This is the distinct feature of the present invention.

The modified silicone compounds specified for use in the present invention are polyether-modified silicones represented by the following formula 2 or formula 3, and alcohol-modified silicones represented by the formula 4 or formula 5 to be given later.

Formula 2:

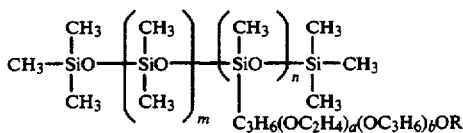

Formula 3:

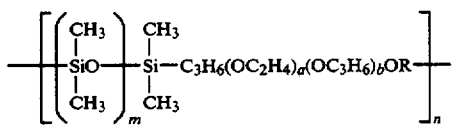

In these formula, R is H, phenyl or alkyl having 1 to 4 carbon atoms, such as $CH_3$ or $C_4H_8$, m+n is 1 to 100, preferably 20 to 100, n/m+n is 0.05 to 1, a+b is 3 to 60, preferably 10 to 60, and a/b is 0/100 (weight ratio).

More specific examples of compounds of the formula 2 or formula 3 are as follows.

a) Compounds of the formula 2 wherein a/b is 100/0 (EO=100). These compounds are dimethylsiloxanemethyl(polyoxyethylene) siloxane copolymers which are commercially available under the following brand names. Shin-Etsu Silicones "KF-351A" and "KF-353A" (products of Shin-Etsu Chemical Co., Ltd.) of Toshiba Silicones "TSF4445" and "TSF4446" (products of Toshiba Silicone Co., Ltd.) NUC Silicones "L-7600" and "L-7605" (products of Nippon Unicar Co., Ltd.)

b) Compounds of the formula 2 wherein a/b is 0/100 (PO=100). These compounds are dimethylsiloxanemethyl(polyoxypropylene)siloxane copolymers which are commercially available under the following brand names. "TSF-4460" (product of Toshiba Silicone Co., Ltd.) NUC Silicones "L-722" and "FZ-2110" (products of Nippon Unicar Co., Ltd.)

c) Compounds of the formula 2 wherein a/b is 20/80 to 50/50. These compounds are dimethylsiloxanemethyl(polyoxyethylene) siloxanemethyl (polyoxypropylene)-siloxane copolymers which are readily available commercially under the brand names given below. "KF-352A", "KF-905" and "X-22-6004" (products of Shin-Etsu Chemical Co., Ltd.) "L-720" and "L-7001" (products of Nippon Unicar Co., Ltd.) Silicone SH-8700 (product of Toray Dow Corning Silicone Co., Ltd.)

Useful alcohol-modified silicones are compounds represented by the formula 4 or formula 5 given below.

Formula 4:

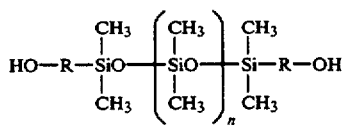

wherein R is $C_1$ to $C_3$ alkylene, and n is 3 to 100, preferable 20 to 100.

Formula 5

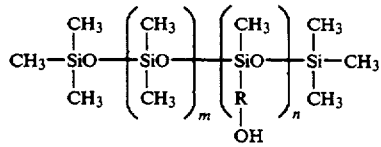

wherein R is $C_1$ to $C_3$ alkylene, and m+n is 5 to 100, preferably 20 to 100.

More specific examples of compounds of the formula 4 and formula 5 are "SF-8427" and "SH-3771" (products of Toray Dow Corning Silicone Co., Ltd.).

A polyalkylene oxide compound such as polyethylene glycol, polypropylene glycol or polyethylene glycol dimethacryate can be used in place of the whole or part of the compound represented by the formula 2, 3, 4 or 5. The polyalkylene glycol or the like to be used is 1000 to 20000, preferably about 2000 to about 4000, in molecular weight.

Stated more specifically, examples of useful polyethylene glycols are those having a molecular weight of 106 to 20000, preferably about 1000 to about 6000. Examples of useful polypropylenes are those having a molecular weight of 134 to 6000, preferably about 1000 to about 4000. Examples of useful polyethylene glycols or methoxyethylene glycol methacrylates are those which are 2 to 30, more preferably about 10 to about 20, in the mole number of ethylene oxide (EO) added.

The polyether-modified silicones already known and represented by the formula 2 or 3 range from hydrophilic to hydrophobic properties according to the polyoxyalkylene content. When highly hydrophilic, the polyether-modified silicone is likely to solidify and encounter difficulty in dissolving in alpha-cyanoacrylates when added thereto. In this case, the silicone becomes readily soluble in the alpha-cyanoacrylate when an acid substance, such as methanesulfonic acid, ether complex salt of boron trifluoride or phosphoric acid, is added to the silicone before addition to the cyanoacrylate. This effect can be satisfactorily achieved by using the acid in an amount of 0.1 to 0.5 wt. %, preferably about 0.1 to about 0.2 wt. %, based on the weight of the polyether-modified silicone. The acid is added while thoroughly stirring the modified silicone.

The adhesive composition of the present invention is prepared by admixing with an alpha-cyanoacrylate represented by the formula 1 a hydrophobic silica in an amount of 0.5 to 15 wt. %, and at least one or at least two of a polyether-modified silicone represented by the formula 2 or 3, an alcohol-modified silicone represented by the formula 4 or 5, and a polyalkylene oxide compound or the like in a combined amount of 0.05 to 5 wt. %, preferably 0.1 to 2.0 wt. %, more preferably 0.15 to 0.5 wt. %, based on the composition.

The polyether-modified silicone of the formula 2 or 3, the alcohol-modified silicone of the formula 4 or 5, or the polyalkylene oxide compound will now be referred to as a "synergist" for enhancing the thickening effect of the hydrophobic silica.

When a composition is prepared by admixing with an alpha-cyanoacrylate a hydrophobic silica in an amount, for example, of 5 to 9 wt. % based on the composition, the composition is a fluid having a viscosity of about 100 to about 300 cps and having no thixotropic characteristics even if further having a thickener, such as an organic polymer mentioned below, incorporated therein. When the "synergist" is added in a small amount, for example, in an amount of 0.15 to 0.3 wt. % based on the fluid composition, to the composition, the fluid composition is converted to a nonfluid pasty composition having a viscosity of about 2300 to about 4300 cps.

If the amount of synergist present in the composition is less than 0.05 wt. %, the thickening effect will not be enhanced greatly, whereas presence of more than 5 wt. % of synergist impairs the stability of the composition itself and results in a reduced bond strength.

The composition of the present invention usually comprises the following proportions of components.

| Alpha-cyanoacrylate | 84.95–94.5 wt. % |
| Hydrophobic silica | 5–15 wt. % |
| Modified silicone and/or poly- alkylene oxide compound of the invention | 0.05–5.0 wt. % |

The alpha-cyanoacrylate to be used as the main component of the present adhesive composition is liable to anionic polymerization as is already known, so that it is desirable to add an anionic polymerization inhibitor to the adhesive composition. More specifically, it is desirable to added to the composition at least one of anionic polymerization inhibitors such as $SO_2$, $BF_3$, HCl, $H_3PO_4$, aromatic sulfonic acids and alkylsulfonic acids, and when required, at least one of radical polymerization inhibitors which are generally used for adhesive compositions of the type described, such as hydroquinone, benzoquinone, catechol, pyrogallol and hydroquinone monomethyl ether.

The amount of such polymerization inhibitors to be used somewhat varies with the kind thereof. Generally, the amount of anionic polymerization inhibitor is 1 to 500 ppm, preferably 5 to 200 ppm, and the amount of radical polymerization inhibitor is 1 to 200 ppm, preferably 10 to 1200 ppm.

The adhesive composition comprising an alpha-cyanoacrylate and a hydrophobic silica may have further incorporated therein other components such as polymethyl methacrylate, methacrylic copolymers, hydroxypropyl cellulose acetate and like organic polymers. The organic polymer is used in a proportion of 0 to 7 wt. %, preferably 0.5 to 3.5 wt. %.

As previously stated, the hydrophobic silica is likely to differ from lot to lot in pH value, and the pH value will affect the properties of the adhesive composition of the present invention. The following experiment was therefore conducted to check the influence.

EXPERIMENT

Compositions were prepared by admixing 8 wt. %, based on the composition, of hydrophobic silica with ethyl alpha-cyanoacrylate (1.5 wt. % of polymethyl methacrylate, having dissolved therein 20 ppm of methanesulfonic acid and 150 ppm of hydroquinone) using silica samples of different production lots for the respective compositions. The compositions were tested for properties. Table 1 shows the results.

TABLE 1

| Hydrophobic silica | Fumed silica treated with dimenthyldichlorosilane | | | | | | | | |
|---|---|---|---|---|---|---|---|---|---|
| Brand name | Aerosil P-972 | | | | | R-974 | R-976 | Reolosil DM-10 | |
| Lot No. | A | A-1 *1 | B | C | D | E | — | — | F | G |
| Specific surface area (BET method) ($m^2/g$) | 111 | — | 102 | 98 | 116 | 109 | 186 | 265 | 100 | 98 |
| pH *2 | 4.0 | 4.2 | 3.9 | 4.3 | 4.1 | 4.4 | 4.0 | 3.8 | 4.8 | 4.9 |
| Setting time (sec) *3 | 65 | 20 | More than 220 | 25 | 30 | 25 | 90 | More than 200 | 20 | 15 |
| Viscosity (cps) *4 | 210 | 230 | 210 | 240 | 220 | 230 | 190 | 180 | 310 | 250 |

Notes to Table 1:
*1: Aerosil R-972 of Lot No. A as heat-treated at 200 to 205° C. at a reduced pressure of up to 0.5 mm Hg for 10 to 20 hours.
*2, pH: A value obtained by dispersing 4 wt. % of the hydrophobic silica in a solution of methanol and water (1:1) and measuring the pH of the dispersion with a pH meter at 20° C.
*3, Setting time: O-rings of NBR, 6.2 mm in outside diameter, were cut vertically, the composition was applied to one of the cut surfaces of each ring, and the cut surfaces were then adhered together. The rings were thereafter forcibly separated one after another with both hands at an interval of 5 seconds to determine the length of time (setting time) taken for the ring to become no longer separable.
*4, Viscosity: Measured at 20° C. by a Brookfield rotational viscometer using rotor No. 3 at 60 r.p.m.

Table 1 shows that the adhesive composition containing hydrophobic silica of lower pH value tends to be longer in setting time. The hydrophobic silica desirable for use in the invention is 4 to 5, more desirably 4.1 to 5.0, in pH value and $100\pm20$ $m^2/g$ in specific surface area.

EXAMPLES

The invention will be described in greater detail with reference to the following examples. The properties were determined by the following methods.

Viscosity: Measured at 20° C. by a BM type rotational viscometer using a rotor specified in corresponding relation with the viscosity of the composition at a specified speed of rotation.

Setting time: See Experiment

Tensile shear strength: Measured by a Shimadzu Autograph S-2000 according to JIS K 6861, Item 6.

Stability test: A sample of composition (2 to 3 g, as placed in a polyethylene tube or aluminum tube) was allowed to stand in a constant-temperature chamber at a temperature of 70°±b 2° C. and checked for changes with time. When the sample was not found to be different from a control after testing for at least 10 days, the result was interpreted as indicating that the composition would remain stable at room temperature for at least one year.

EXAMPLE 1 (a)

A polyether-modified silicone, "SH-8700" (product of Toray Dow Corning Silicone Co., Ltd.), was admixed in varying amounts with a composition (Table 2) comprising ethyl alpha-cyanoacrylate and a hydrophobic silica (Aerosil R-972, product of Degussa) to prepare compositions containing 0 to 5 wt. % of the modified silicone. The compositions obtained were tested for various properties. Table 2 shows the result.

Table 2 reveals that the presence of the polyether-modified silicone of the invention in the composition in an amount of 0.05 to 5.0, preferably 0.1 to 2.0, most preferably 0.15 to 0.5, wt. % makes the composition serviceable as a nonflowable pasty adhesive composition.

EXAMPLE 2

A series of compositions (Table 3) were prepared from ethyl alpha-cyanoacrylate, Aerosil R-972 and polyether-modified silicone "SH-8700" of the invention (the same as those used in Example 1 the proportions given in Table 3 and were tested for properties. Table 3 shows the result.

Even when containing about 12 to about 15 wt. % of "Aerosil R-872," the composition is about 750 to about 900 cps in viscosity and is flowable if "silicone SH-8700" for use in the invention is absent. However, presence of "silicone SH-8700," for example, in an amount of 0.15 to 0.25 wt. % affords a thixotropic pasty composition having a viscosity of 14400 to 43000 cps when the composition contains 7 to 9 wt. % of "Aerosil R-972." The resulting composition is excellent in properties in respect of setting time and stability for use as an adhesive composition of the type mentioned.

TABLE 2

| Adhesive composition | | | Properties of composition | | | | |
|---|---|---|---|---|---|---|---|
| Ethyl α-cyanoacrylate (wt. %) *1 | Hydrophobic silica Aerosil R-972 (wt. %) *2 | Polyether-modified silicone SH-8700 (wt. %) *3 | Appearance | Viscosity (cps) | Setting time (sec) | Tensile shear strength ($kg/cm^2$) | Stability Heating at 70° C. |
| 92.0 | 8.0 | 0 (none) | *a | 230 | 20~30 | 132 | *b |
| 91.98 | 8.0 | 0.02 | *a | 260 | 20~30 | 146 | *b |
| 91.95 | 8.0 | 0.05 | *c | 3100 | 20~30 | 137 | *b |
| 91.90 | 8.0 | 0.10 | Soft paste | 16500 | 20~30 | 145 | *b |
| 91.85 | 8.0 | 0.15 | Smooth paste | 32000 | 20~30 | 143 | *b |
| 91.8 | 8.0 | 0.20 | Smooth paste | 33500 | 20~30 | 139 | *b |
| 91.7 | 8.0 | 0.30 | Smooth paste | 33000 | 20~30 | 145 | *b |
| 91.5 | 8.0 | 0.50 | Smooth paste | 35700 | 20~30 | 140 | *b |
| 91.0 | 8.0 | 1.0 | Smooth paste | 36000 | 30~40 | 120 | *d |
| 90.0 | 8.0 | 2.0 | Slightly hard paste | 54000 | 40~50 | 116 | Thickened in 15 days |
| 87.0 | 8.0 | 5.0 | Viscous paste | 36000 | More than 70 | 62.5 | *e |

*a: Flowable liquid
*b: Good for 20 days
*c: Non-cobwebbing liquid
*d: Thickened in 17-18 days
*e: Thickened in 9-10 days Notes to Table 2:
*1: The ethyl alpha-cyanoacrylate contains 1.5 wt. % of Acricon AC (polymethyl methacrylate), product of Mitsubishi Rayon Co., Ltd., 30 ppm of methanesulfonic acid and 200 ppm of hydroquinone.
*2: Aerosil R-972 (product of Degussa) is a hydrophobic fumed silica as surface-treated with dimethyldichlorosilane and having a pH value of 4.2 and a specific surface area of 107 $m^2/g$.
*3: Polyether-modified silicone SH-8700 (product of Toray Dow Corning Silicone Co., Ltd.) for use in the invention is a dimethyl-siloxane-methyl (polyoxyethylene) siloxane-methyl (polyoxypropylene) siloxane copolymer of the formula 2 wherein m + n is 20 to 100, a + b is 30 to 60 and a/b is 20/80 to 50/50. This silicone SH-8700 is hydrophilic and low in affinity for alpha-cyanoacrylate, and therefore has added thereto 0.1% of $(C_2H_5)_2O.BF_3$ based on th e weight of silicone to give improved affinity.

EXAMPLE 1 (b)

The procedure of Example 1 (a) was repeated with the exception that KF-905 was used instead of SH-8700.

The stability, heated at 70° C. of the composition thus produced, has been improved by another 3 to 5 days compared with that of each composition produced by means of Example 1 (a). The tests on the other physical properties indicated almost same effects. On KF-905 (products of Shinetsu Chemical Co., Ltd.), R shows phenyl group in the chemical compound represented by Formula 2. It is polyether-modified silicone with viscosity of 700 cs at 25° C., specific gravity of 1.03 at 25° C., index of refraction of 1.448 at 25° C.

TABLE 3-1

| Adhesive composition | | | Properties of composition | | | |
|---|---|---|---|---|---|---|
| Ethyl α-cyanoacrylate (wt. %) | Aerosil R-972 (wt. %) | Polyether-modified silicone SH-8700 (wt. %) | State of composition | Viscosity (cps) | Setting time (sec) | Stability Heating at 70° C. |
| A | | | | | | |
| 99.45 | 0.5 | 0.05 | *a | 40 | 5 | Good for 20 days |
| 98.85 | 1.0 | 0.15 | *a | 70 | 5~10 | Good for 20 days |
| 96.85 | 3.0 | 0.15 | *a | 620 | 5~10 | Good for 20 days |
| 94.85 | 5.0 | 0.15 | *b | 2250 | 15~20 | Good for 20 days |
| 93.85 | 6.0 | 0.15 | Soft paste | 5200 | 15~20 | Good for 20 days |
| 92.80 | 7.0 | 0.20 | Soft paste | 14400 | 20~25 | Good for 20 days |
| 91.80 | 8.0 | 0.20 | Smooth paste | 34000 | 20~30 | Good for 20 days |

TABLE 3-1-continued

| Adhesive composition | | | Properties of composition | | | |
|---|---|---|---|---|---|---|
| Ethyl α-cyanoacrylate (wt. %) | Aerosil R-972 (wt. %) | Polyether-modified silicone SH-8700 (wt. %) | State of composition | Viscosity (cps) | Setting time (sec) | Stability Heating at 70° C. |
| 90.80 | 9.0 | 0.20 | Smooth paste | 43000 | 20~30 | Good for 20 days |
| 88.75 | 11.0 | 0.25 | Slightly hard paste | 80300 | 30~35 | Good for 20 days |
| 87.75 | 12.0 | 0.25 | Hard paste | At least 100000 | 70~80 | Thickened in 17-18 days |
| 84.97 | 15.0 | 0.03 | *a | 860 | 80~90 | Thickened in 14-15 days |
| 84.95 | 15.0 | 0.05 | Viscous paste | 6300 | 80~90 | Thickened in 12-13 days |
| B | | | | | | |
| 88.0 | 12.0 | 0 | *a | 750 | 30~40 | Good for 20 days |
| 85.0 | 15.0 | 0 | *a | 900 | 80~90 | Thickened in 14-15 days |
| 95.0 | 0 | 5.0 | Liquid of low viscosity | 3.2 | 60~70 | Thickened in 7-8 days |

A: Composition of invention
B: Comparative experiment
*a: Flowable liquid
*b: Non-cobwebbing liquid

EXAMPLE 3

With ethyl alpha-cyanoacrylate (containing 1.0 wt. % of polymethyl methacrylate, 20 ppm of methanesulfonic acid and 300 ppm of hydroquinone) was admixed "Aerosil R-972" (4.3 in pH and 112 m²/g in specific surface area) in such an amount that the resulting composition contained 8.0 wt. % of the silicone. Various "synergists" of the invention were added to portions of the composition to prepare a series of compositions of the invention each containing 0.2 to 0.35 wt. % of the synergist as shown in Table 4. The compositions were tested for properties with the result given in Table 4.

The table also shows the result obtained by testing compositions of comparative examples wherein various silicone compounds other than the "synergists" were used.

Thixotropic pasty compositions are obtained by adding various "synergists" of the invention in a small amount (about 0.2 wt. %) to the flowable composition having a low viscosity and prepared from the alpha-cyanoacrylate and "Aerosil R-972."

The use of polyalkylene oxide compounds as "synergists" tends to result in lower stability than when polyether- or alcohol-modified silicones are used, but the compositions obtained are satisfactorily usable as adhesive compositions.

On the other hand, the compositions obtained with use of silicone compounds other than the "synergists" all had problems as to stability and were difficult to use as adhesive compositions.

TABLE 4

| No. | "Synergist" Amount added (wt. %) | Viscosity (cps) | Stability Heating at 70°C. |
|---|---|---|---|
| Composition of invention | | | |
| 1 | KF-353A 0.2 | 31,300 | Good for 20 days |
| 2 | FZ-2108 0.2 | 34,100 | Good for 20 days |
| 3 | KF-352A 0.2 | 32,800 | Good for 20 days |
| 4 | L-722 0.2 | 40,500 | Good for 20 days |
| 5 | F-178-05 0.3 | 32,000 | Good for 20 days |
| 6 | F-178-09 0.3 | 24,200 | Good for 20 days |
| 7 | SF-8427 0.35 | 39,600 | Good for 20 days |
| 8 | BY-16-036 0.35 | 44,000 | Good for 20 days |

TABLE 4-continued

| No. | "Synergist" Amount added (wt. %) | Viscosity (cps) | Stability Heating at 70°C. |
|---|---|---|---|
| 9 | PEG-2000 0.2 | 36,200 | Thickened in 13-14 days |
| 10 | PEM-1000 0.2 | 32,700 | Thickened in 15 days |
| Comp. Ex. | | | |
| 11 | KF-101 0.2 | 170 | Thickened in 1-2 days |
| 12 | X-22-162A 0.2 | 190 | Thickened in 5 days |
| 13 | KF-393 0.2 | | Hardened 1-3 min. after addition |
| 14 | TSF-437 0.2 | 180 | Thickened in 15-16 days |
| 15 | TSF-484 0.2 | 185 | Thickened in 2-3 days |
| 16 | PDMS-8 0.2 | 170 (turbid) | Hardened in 2-3 days |
| 17 | PDMS-25 0.2 | 177 (turbid) | Hardened in 2-3 days |
| 18 | PDMS-66 0.2 | 175 (turbid) | Hardened in |

TABLE 4-continued

| No. | "Synergist" Amount added (wt. %) | Viscosity (cps) | Stability Heating at 70°C. |
|---|---|---|---|
| | | | 2-3 days |

In Table 4:
1, KF-353A: Dimethylsiloxane-methyl (polyoxyethylene)-siloxane compolymer manufactured by Shin-Etsu Chemical Co., Ltd. and represented by the formula 2 wherein m + n is 25 to 30, a + b is 9 to 10 and a/b (EO/PO ratio) is 100/0 (EO:100).
2, FZ-2108: Dimethylsiloxane-methyl (polyoxyethylene)-siloxane-methyl (polyoxypropylene) siloxane copolymer manufactured by Nippon Unicar Co., Ltd., represented by the formula 2 wherein a/b (EO/PO ratio) is 50/50 and having a viscosity of 22000 cs/25° C. and a siloxane content of 55%.
3, KF-352A: Dimethylsiloxane-methyl (polyoxyethylene)-siloxane-methyl (polyoxypropylene) siloxane copolymer manufactured by Shin-Etsu Chemical Co., Ltd., represented by the formula 2 wherein m + n is 20 to 100, a + b is 30 to 60 and a/b is 50/50 and having a viscosity of 1600 cs/25° C.
4, L-722: Dimethylsiloxane-methyl (polyoxypropylene)-siloxane copolymer manufactured by Nippon Unicar Co., Ltd. and represented by the formula 2 wherein m + n is 90 to 100, a + b is 5 to 10 and a/b is 0/100 (PO:100).
5, F-178-05: Dimethylsiloxane-methyl (polyoxyethylene)-siloxane copolymer manufactured by Nippon Unicar Co., Ltd., represented by the formula 3 wherein a/b is 100/0 (EO:100) and having a viscosity of 4600 cs/50° C. and a siloxane content of 35%.
6, F-178-09: Dimethylsiloxane-methyl (polyoxypropylene)-siloxane copolymer manufactured by Nippon Unicar Co., Ltd., represented by the formula 3 wherein a/b is 0/100 (PO:100) and having a viscosity of 15200 cs/25° C. and a siloxane content of 75%.
7, SF-8427: Silocone modified with alcohol at both terminals, manufactured by Toray Dow Corning Silicone Co., Ltd., represented by the formula 4 and having a viscosity of 320 cs/25° C. and an OH equivalent of 1200 KOH mg/g.
8, BY-16-036: Side chain-type alcohol modified silicone manufactured by Toray Dow Corning Silicone Co., Ltd., represented by the formula 5 and having a viscosity of 630 cs/25° C. and an OH equivalent of 1400 KOH mg/g.
9, PEG-2000: Polyethlene glycol about 2000 in molecular weight.
10, PEM-1000: Polyethlene glycol dimethacrylate (EO addition mole number: 20), product of Dai-ichi Kogyo Seiyaku Co., Ltd.
11, KF-101: Epoxy-modified silicone manufactured by Shin-Etsu Chemical Co., Ltd. and having a viscosity of 200 cs/25° C. and an epoxy eequivalent of 350 g/mol.
12, X-2-162A: Carboxy-modified silicone manufactured by Shin-Etsu Chemical Co., Ltd. and having a viscosity of 110 cs/25° C. and a —COOH equivalent of 920 KOH mg/g.
13, KF-393: Amino-modified silicone manufactured by Shin-Etsu Chemical Co. and having a viscosity of 60 cs/25° C. and an amino equivalent of 360 g/mol.
14, TSF-437: Methylphenylpolysiloxane, product of Toshiba Silicone Co., Ltd.
15, TSF-484: Methylhydrogenpolysiloxane, product of Toshiba Silicone Co., Ltd.
16, PDMS-8: Polydimethylsiloxane having a molecular weight of about 770.
17, PDMS-25: Polydimethylsiloxane having a molecular weight of about 2500.
18, PDMS-66: Polydimethylsiloxane having a molecular weight of about 6600.

EXAMPLE 4

A modified silicone of the invention was added to compositions comprising one of alpha-cyanoacrylates and a hydrophobic silica treated with dimethyldichlorosilane (Aerosil R-972 of the same grade as the one used in Example 3) as listed in Table 5 to obtain compositions, which were then compared with the initial compositions free from the modified silicone, with respect to appearance and properties (Table 5).

Table 5 reveals that the addition of modified silicones of the invention greatly thickened the initial compositions, and that the addition resulted in little or no difference in the stability and setting time.

TABLE 5

| | Adhesive composition | | | | Properties of composition | | |
|---|---|---|---|---|---|---|---|
| Kind of α-cyanoacrylate | Hydrophobic silica Aerosil R-972 (wt. %) | Modified silicone of invention (wt. %) | P-MMA (wt. %) | Stabilizer (ppm) | Viscosity (cps) | Setting time (sec) | Stability Heating at 70° C. |
| A | | | | | | | |
| Methyl ester | 7.5 | L-722 0.2 | 1.2 | MS: 20 HQ: 200 | 26000 (paste) | 10~20 | Good for 20 days |
| Allyl ester | 7.5 | SF-8427 0.3 | 1.2 | SO$_2$: 40 HQ: 500 | 25000 (paste) | 30~40 | Good for 20 days |
| 2-Methoxyisopropyl ester | 7.5 | SH-8700 0.25 | 1.0 | MS: 20 HQ: 100 | 27000 (paste) | 30~40 | Good for 20 days |
| B | | | | | | | |
| Methyl ester | 7.5 | None | 1.2 | MS: 20 HQ: 200 | 120 (fluid) | 10~20 | Good for 20 days |
| Allyl ester | 7.5 | None | 1.2 | SQ$_2$: 40 HQ: 500 | 130 (fluid) | 20~30 | Good for 20 days |
| 2-Methoxylsopropyl ester | 7.5 | None | 1.0 | MS: 20 HQ: 100 | 12.5 (fluid) | 20~30 | Good for 20 days |

A: Composition of Invention
B: Comparative Experiment
In Table 5:
SH08700: The same as in Example 1.
L-722, SF-8427: The same as in Example 3.
P-MMA: Polymethyl methacrylate.
MS: Methanesulfonic acid.
HQ: Hydroquinone.
SO$_2$: Sulfur dioxide.

What we claim is:

1. An adhesive composition comprising an alpha-cyanoacrylate and a hydrophobic silica surface-treated with dimethyldichlorosilane, the composition being characterized in that the composition has incorporated therein at least one of a polyether-modified silicone or alcohol-modified silicone in an amount of 0.05 to 5.0% based on the weight of the composition.

* * * * *